United States Patent [19]

Dekel

[11] Patent Number: 4,655,704
[45] Date of Patent: Apr. 7, 1987

[54] COOLING SYSTEM FOR A PLASTIC EXTRUSION CALIBRATING TOOL

[76] Inventor: Joseph Dekel, 4532 Jubilo Dr., Tarzana, Calif. 91356

[21] Appl. No.: 840,014

[22] Filed: Mar. 17, 1986

[51] Int. Cl.⁴ .................. B29C 47/12; B29C 47/86; B29C 47/88
[52] U.S. Cl. ..................... 425/461; 165/142; 425/378 R; 425/380; 425/405 R; 425/509
[58] Field of Search ............... 425/404, 504, 507, 509, 425/378 R, 380, 461, 4 C, 817 C, 405; 165/142, 169

[56] References Cited

U.S. PATENT DOCUMENTS

| | | | |
|---|---|---|---|
| 883,343 | 3/1908 | Porter | 165/142 |
| 1,961,660 | 6/1934 | Fehrman | 165/169 |
| 3,857,914 | 12/1974 | Aishima et al. | 425/4 C |
| 3,874,837 | 4/1975 | Jamieson | 425/461 |
| 4,145,175 | 3/1979 | Groff et al. | 425/461 |
| 4,201,534 | 5/1980 | Phipps | 425/461 |
| 4,516,044 | 5/1985 | Bone | 165/169 |

FOREIGN PATENT DOCUMENTS

| | | | |
|---|---|---|---|
| 0126141 | 10/1981 | Japan | 425/547 |
| 0002740 | 1/1982 | Japan | 425/547 |
| 9735 | 7/1923 | Netherlands | 165/142 |

*Primary Examiner*—Willard E. Hoag
*Attorney, Agent, or Firm*—Charles H. Schwartz; Ellsworth R. Roston

[57] ABSTRACT

A cooling fluid path formed in a calibrating tool body member includes a plurality of parallel openings extending within the body member from one side of the body member. The one side of the body member includes a slot interconnecting the parallel openings. A plate member covers the one side of the body member to close the slot to form a fluid path. A plurality of baffle members, each positioned from the plate member and across the slot and within one of the openings partially along the length of the opening, forms a serpentine fluid path back and forth within each opening on both sides of the baffle and between adjacent openings within the slot.

9 Claims, 7 Drawing Figures

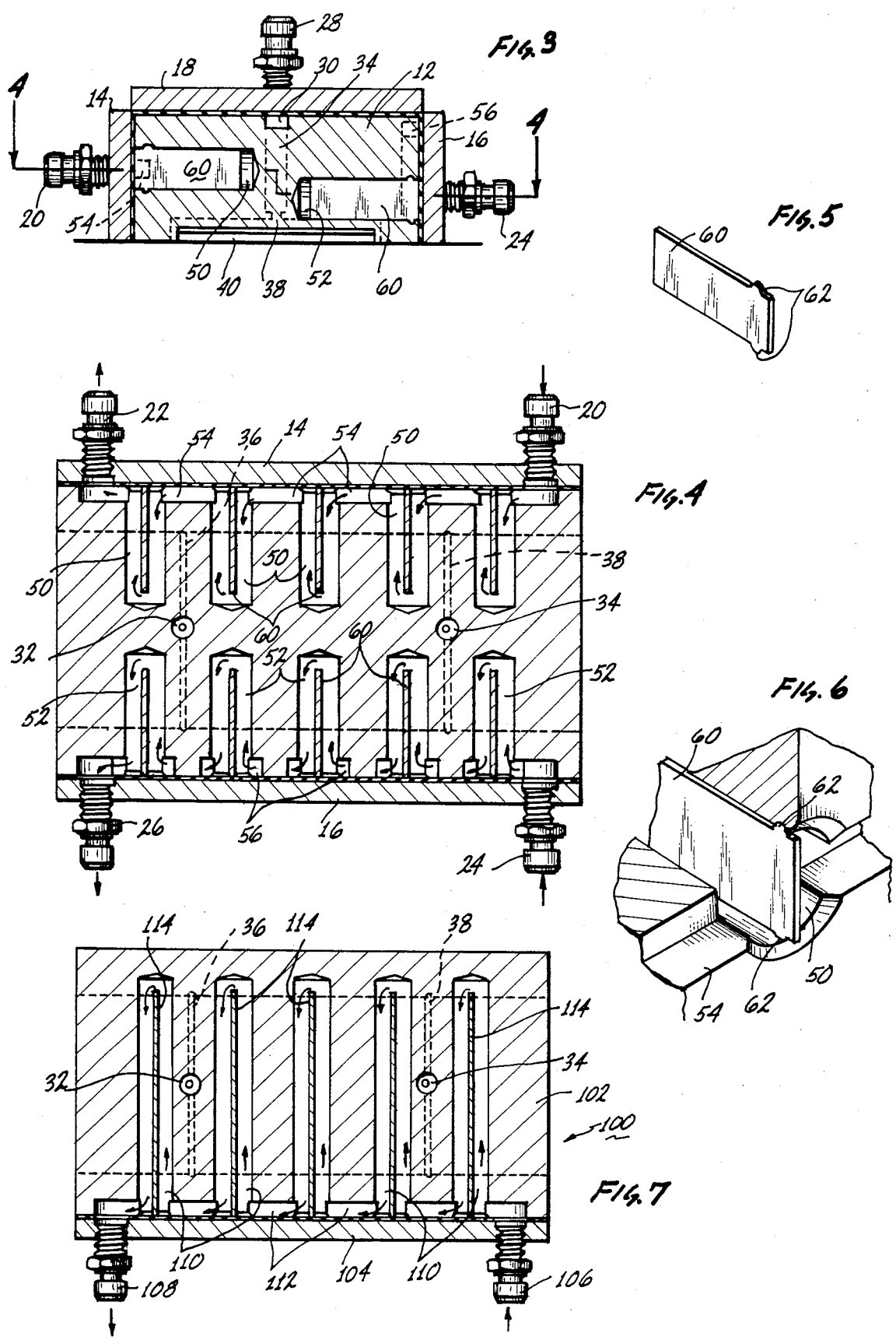

COOLING SYSTEM FOR A PLASTIC EXTRUSION CALIBRATING TOOL

BACKGROUND OF THE INVENTION

1. Field of the Invention

The present invention relates to a cooling system for a plastic extrusion calibrating tool. More specifically, the present invention provides for a cooling system which allows for a greater equivalent cooling of a cooling fluid for a particular volume of cooling fluid to thereby provide for a more efficient cooling of a calibrating tool in an extrusion system.

2. Discription of the Prior Art

In the extrusion of plastic materials to a desired shape, the extruded material is passed through a calibrating tool. The calibrating tool has a configuration to provide for a desired shape for the extruded article. The calibrating tool generally includes a channel of a particular length so as to confine the extruded material within the length of the calibrating tool. This allows the extruded material to be cooled sufficiently so that when the extruded material leaves the calibrating tool, the extruded material maintains its desired shape. In order to insure that the extruded material is cooled sufficiently, calibrating tools may include the use of coolant which is circulated within the interior of the calibrating tool in order to draw off the heat from the extruded material as it passes down the length of the calibrating tool.

Prior art calibrating tools have suffered from not having a sufficient volume of circulation of coolant and not having a sufficient surface area for the path of the coolant within the calibrating tool so as to draw off as much heat as desired for a given length of the calibrating tool.

SUMMARY OF THE INVENTION

The present invention provides for a cooling system for a plastic extrusion calibrating tool which allows for a relatively high volume of the coolant to flow through the calibrating tool and thereby provide for a high efficiency in the cooling of the extruded material. In addition the particular path for the cooling fluid, as provided in the calibrating tool of the present invention, has a large surface area in contact with the body of the calibrating tool to thereby also provide for a high degree of cooling of the plastic extruded material.

The calibrating tool of the present invention includes at least one coolant path having a serpentine shape and with this coolant path provided for by a plurality of openings passing into the body of the calibrating tool. Each opening has a relatively large diameter so as to maximize the surface area formed between the opening and the remaining body of the calibrating tool. Adjacent openings are interconnected by slots on the side of the calibrating tool, which slots thereby provide for pathways between adjacent openings when the side of the calibrating tool is covered by plate member. Finally, a baffle member is inserted into each opening and with the baffle extending from the side plate to a position short of the depth of the opening.

Each baffle forms a partition to subdivide the opening and thereby provide for a "U" shaped channel within each opening for the flow of cooling fluid. The cooling fluid flows along a serpentine path extending first into the opening between one side of the baffle and one side of the opening and then out of the opening between the other side of the baffle and the other side of the opening. The serpentine pathway continues between the adjacent openings through the slots on the side of the calibrating tool which slots interconnect the adjacent openings.

The above structure provides for a relatively large pathway for the flow of cooling fluid and with this pathway having a large surface area for contact between the coolant and the body of the calibrating tool. Specifically, the surface area includes the diameter of the opening, plus the area formed by both sides of the baffle and including the area formed by each slot interconnecting the adjacent openings. This surface area would be considerably larger than if the same size openings were used and with these openings extending back and forth across the calibrating tool. This is because the use of the baffles provides for a greatly increased surface area in the structure of the present invention. In addition, the surface area of the pathway is larger than round pathways which would support a similar volume of cooling fluid.

The present invention also provides for a low cost structure, since the calibrating tool may be formed simply of openings drilled into the body of the calibrating tool and slots machined between the openings and with the baffles positioned within the openings and retained within the openings by friction means. This provides for an ease of construction and allows for a relatively low cost for the calibrating tool structure of the present invention.

BRIEF DESCRIPTION OF THE DRAWINGS

A clearer understanding of the present invention will be had with reference to the following description and drawings wherein:

FIG. 3 is a cross-sectional view of the first embodiment of the calibrating tool taken along lines 3—3 of FIG. 2;

FIG. 4 is a cross-sectional view of the first embodiment of the calibrating tool taken along lines 4—4 of FIG. 3;

FIG. 5 is a detail view of a baffle used with the first embodiment of the invention;

FIG. 6 is a detail view illustrating the baffle inserted into an opening and showing the frictional holding means; and FIG. 7 is a top cross-sectional view of a second embodiment of the present invention.

DESCRIPTION OF THE PREFERRED EMBODIMENTS

Figure 1:
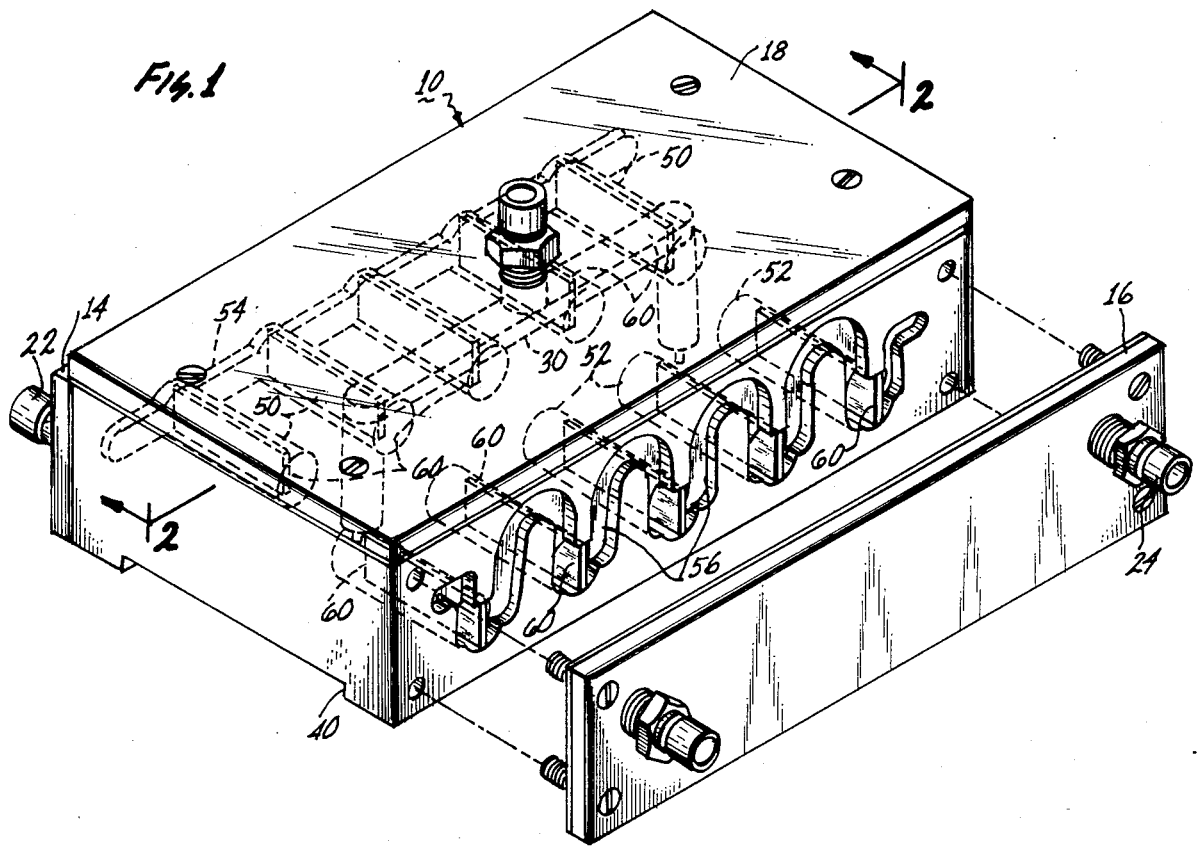
FIG. 1 is a perspective partially exploded view of a first embodiment of a calibrating tool constructed in accordance with the teachings of the present invention.

FIGS. 1 through 5 illustrate a first embodiment of the invention. Specifically a calibrating tool 10 includes a body portion 12, side plates 14 and 16 and a top plate 18. The side plate 14 includes a pair of fluid connecters 20 and 22 extending through the side plate 14. Similarly, side plate 16 includes a pair of fluid connecters 24 and 26 extending through the side plate 16. Fluid connecters 20 and 24 may be used for the introduction of a cooling fluid, such as water, to the calibrating tool and with connecters 22 and 26 used as the outlet of the cooling fluid from the calibrating tool. The flow of the cooling fluid may be reversed if it is desired to have the warmer fluid adjacent the position where the extruded material enters the calibrating tool.

The cover plate 18 may also include a connecter 28 and with this connecter extending through the cover plate 18 and used for the introduction of vacuum to the calibrating tool. Specifically, as shown in the drawings, the body portion 12 of the calibrating tool includes a slot 30 machined into the upper surface of the body. Extending downward from the slot 30, are a pair of circular openings 32 and 34 and with these openings terminating in a pair of slots 36 and 38 which slots extends across the bottom surface of the calibrator body.

Figure 2:
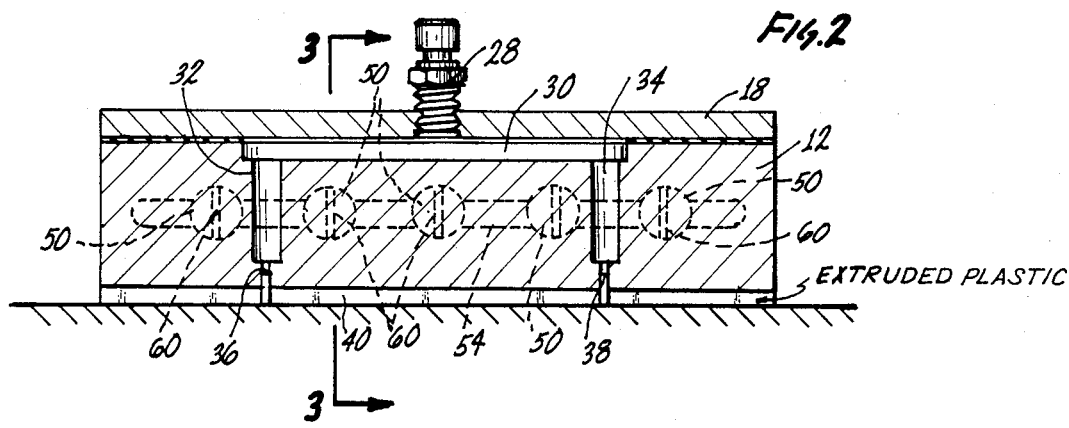
FIG. 2 is a cross-sectional view of the first embodiment of the calibrating tool taken along lines 2—2 of FIG. 1.

The bottom surface of the calibrator body 12 includes an elongated channel 40 which extends from one end of the calibrator body to the other. As can be seen in FIG. 2, the channel 40 has a slight taper from the input end of the calibrator to the output end of the calibrator. Specifically, as the extruded material is introduced into the calibrating tool, the calibrating tool maintains the extruded material in the desired shape. The shape of the channel 40 complements the shape of the extruded material. The slight tapering of the channel 40 allows for a slight expansion of the extruded material as it cools and proceeds outward. The use of the vacuum introduced through the vacuum connecter 28 facilitates the movement of the extruded material through the calibrating tool.

The extruded plastic comes in contact with the calibrating body 12 as the extruded material passes down the channel 40. The calibrating body 12 thereby becomes heated due to the heat of the extruded material. In order to facilitate the dissipation of this heat, the present invention provides for a particular structure to allow for the introduction of cooling fluid through the body of the calibrating body to extract the heat from and thereby constantly cool the calibrating tool 10.

The actual coolant pathway is provided by a novel construction formed by a plurality of openings in the calibrator body. Specifically, a first plurality of openings 50 are provided along one side of the calibrator body and a second plurality of openings 52 are provided along the other side of the calibrator body. As can be seen in FIG. 3, the openings 50 and 52 are offset from each other, but both extend from the opposite side faces of the calibrator body 12. Each opening is actually formed by drilling into the calibrator body a predetermined distance from the side face of the calibrator body 12.

The openings 50 are linked together by a machined slot 54 which thereby interconnects the end portions of adjacent openings 50. Similarly, a serpentine slot 56 is machined across the other face of the calibrator body 12 to interconnect the ends of adjacent openings 52. At this point in the construction of the calibrating tool, the various openings would not form a good fluid path since all of the openings extend off in a parallel arrangement from a common flow path formed by the slots 54 and 56. The present invention however, incorporates a novel baffle member 60 so that the combination of the openings 50 and 52 and the slots 54 and 56 are converted into a pair of serpentine fluid paths having a large surface area relative to the calibrator body and thereby providing for an efficient cooling of the calibrator body and thereby the extruded plastic.

FIG. 5 illustrates a particular structure for a baffle 60 which may be used to bisect all of the openings 50 and 52. Specifically, as shown in the drawings, all of the openings 50 and 52 include a baffle member 60 extending from the side members 14 and 16 covering the sides of the calibrator body 12. The baffles 60 partition the slots 54 and 56 and partition the openings 50 and 52 but extend short of the full depth of the openings 50 and 52. The baffles 60 are actually held in place by friction since the baffles are designed to have a width approximately the same as the diameter of the openings 50 and 52.

In addition, the baffles include a pair of nipple members 62 which extend outwardly and are used to lock into the surface of the opening when the baffle 60 is forced into the position bisecting any of the openings 50 and 52. This may be seen with greater detail in FIG. 6 where the nipples 62 are shown locked in position when forced within one of the openings 50. This structure therefore provides for a very simple construction for the calibrating tool, since the baffles may be inserted into the openings and then lightly driven into the proper position to bisect the openings and thereby provide for a double pathway within each opening.

The side plates 14 and 16 are then locked into position, as shown by the screws in FIG. 1, and at this point the calibrating tool is ready to receive the cooling fluid. The actual path for the cooling fluid is shown by the arrows in FIG. 4 and it can be seen that cooling fluid enters through the connecter 20 and then passes into and out of each opening 50 in turn, first on one side and then on the other side of the baffle 60 and with each opening interconnected by the slot 54. Since the baffle 60 provides a barrier to any fluid directly along the slot 54, the fluid is forced to follow the serpentine path from the input connecter 20 to the output connecter 22. The same occurs on the side of the calibrating tool.

The fluid is in contact with a large surface area during its pathway from the input to output connecters. This is because the surface area is formed not only by the surface area of the openings 50 and 52, but is also formed by the surface area represented by both sides of the baffle 60. This greatly increases the surface area and facilitates the elimination of a additional amount of heat relative to a fluid path formed in a conventional fashion.

FIG. 7 illustates a second embodiment of the invention using a single set of openings all extending from one side of a calibrating tool. Specifically, as shown in FIG. 7, a calibrating tool 100 includes a body 102 and a side plate 104. Fluid connecters 106 and 108 extend through the side plate 104. The calibrating tool 100 will also include a top plate (not shown) substantially identical to the top plate 18 shown in FIG. 1. This top plate would include a vacuum connecter and a slot extending to the openings 32 and 34 and terminating in elongated slots 36 and 38.

A plurality of openings 110 extend from one side of the calibrator body, which side includes the side plate 104. These openings are substantially identical to the openings 50 or 52 of the first embodiment, but are longer in length. In addition, a slot 112 interconnects the ends of the openings 110. Finally, a plurality of baffles 114 extend down the length of the openings 110, but with each baffle not as long as the depth of each opening 110.

It can be seen that the second embodiment of the invention, as shown in FIG. 7, operates on substantially the same principal as the first embodiment of the invention. Specifically, the plurality of openings 110 are bisected by the baffles 114 to form a serpentine fluid path as shown by the arrows. Fluid, therefore, when introduced through the fluid connecters 106, follows the serpentine path. The cooling fluid flows first into and then out of each opening 110 on one side and then the other side of each baffle 60 and with the slots 112 interconnecting one opening 110 to another.

The baffles 114 are essentially identical to the baffles 60 and include nipple members, but with the baffles 114 being substantially longer so as to accommodate the longer length of the openings 114. The constructions, however, of the second embodiment of the invention, also provides for an increase in surface area to thereby increase the efficiency of the calibrating tool to extract a greater amount of heat from the extruded material as it transverses the length of the calibrating tool.

It can be seen therefore, that the present invention provides a simple construction for a calibrating tool which construction utilizes at least a first plurality of openings extending from one side of the body of the calibrating tool and with the ends of the openings interconnected by a slot extending along the side of the calibrating body and with the openings and the slots bisected by baffle members, so as to provide for a serpentine path for a cooling fluid used with a calibrating tool.

Although the invention has been discribed with reference to particular embodiments, it is to be appreciated that various adaptations and modifications may be made and the invention is only to be limited by the apended claims.

I claim:

1. A calibrating tool for use with extruded plastic, including
   a solid block body member defining an elongated calibrating channel for receiving and supporting the extruded plastic for cooling,
   a plurality of openings extending from at least one side of the body member,
   a slot formed in the one side of the body for interconnecting the adjacent openings
   a plate member for covering the one side of the body member to close the slot to form a fluid path down the slot and into each opening,
   a pair of spaced fluid connectors extending through the plate member to form an inlet and outlet for a cooling fluid, and
   a plurality of baffles extending from the plate member and with individual ones of the baffles positioned within and extending partially down the length of individual ones of the openings to partition the openings and slot to form a serpentine fluid path extending down and back along the openings along both sides of the baffle and along the slot between adjacent openings.

2. The calibrating tool of claim 1 wherein
   the plurality of openings extend only from one side of the body member and with the depth of the openings less than the dimension of the body member accommodating the depth of the opening.

3. The calibrating tool of claim 1 wherein
   the plurality of openings extend from two sides of the body member and including a slot on each side and a plate member for covering each side.

4. The calibrating tool of claim 3 wherein
   the plurality of openings extend from opposite sides and are offset from each other.

5. The calibrating tool of claim 3 wherein
   the depth of the openings is less than the dimension of the body member accommodating the depth of the opening.

6. The calibrating tool of claim 1 wherein
   the openings are round and the baffles bisect the round openings.

7. The calibrating tool of claim 1 wherein
   the baffles have a size to be held within the openings by friction.

8. The calibrating tool of claim 7 wherein
   each baffle additionally includes at least one protrusion extending outward to engage with force the surface of the opening to lock the baffle within the opening.

9. The calibrating tool of claim 1 additionally including means for supplying vacumn to the body member which means includes vacumn openings extending into the body member which vacumn openings pass adjacent to but do not intercept the cooling openings.

* * * * *